United States Patent Office 3,499,030
Patented Mar. 3, 1970

3,499,030
FUNGICIDAL COMPOUNDS CONTAINING THE NSCFClBr-GROUP
Engelbert Kuhle, Erich Klauke, Ferdinand Grewe, and Helmut Kaspers, Leverkusen, Germany, assignors to Farbenfabriken Bayer Aktiengesellschaft, Leverkusen, Germany, a corporation of Germany
No Drawing. Continuation of application Ser. No. 554,207, May 31, 1966, which is a continuation of application Ser. No. 186,360, Apr. 10, 1962. This application Mar. 5, 1968, Ser. No. 716,682
Claims priority, application Germany, Apr. 19, 1961, F 32,468
Int. Cl. C07d 27/52; C07c 145/00
U.S. Cl. 260—551                       2 Claims

---

ABSTRACT OF THE DISCLOSURE

Fungicidally active sulphenic acid derivatives of the general formula

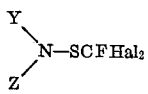

wherein Y is defined as a member selected from the group consisting of N,N-dialkylamino, having an alkyl moiety of 1–2 carbon atoms, phenyl, chlorophenyl, dichlorophenyl, nitrophenyl, nitro chlorophenyl, tolyl and chloromethyl, Y being attached to the nitrogen atom with a bridging —$SO_2$— group; Z is a member selected from the group consisting of phenyl, fluorophenyl, lower alkyl phenyl, chlorophenyl, lower alkyl, alkyl carbonyl having an alkyl moiety of 1–2 carbon atoms

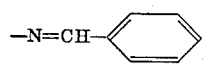

and

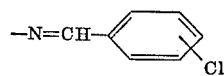

and Y and Z in combination with the nitrogen atom are defined as heterocyclic rings.

---

The present invention relates to and has as its objects new and useful fungicidal compounds. More particularly this invention is a continuation of copending Ser. No. 554,207, filed May 31, 1966, now abandoned, which in turn is a continuation of copending Ser. No. 186,360, filed Apr. 10, 1962, now abandoned, and has as its objects sulphenic acid derivatives of the general formula

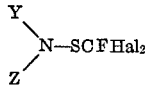

in which the symbols Y and Z represent CO- and/or $SO_2$-groups which are further linked with any similar or different organic radical, and optionally substituted amino group or any common organic radical (with ring coupling), and Z can also stand for any organic radical, optionally linked via a further hetero-atom to the nitrogen and wherein Hal means chlorine, bromine and/or fluorine, whereby at least one Hal should be bromine or fluorine.

The invention also relates to improvements in fungicidal preparations and more particularly to improved fungicides as well as to methods of protecting organic material subject to attack by low orders of organisms especially by fungi. This invention further relates to processes for the production of the new compounds of the formula as given above.

Similar fungicidal sulphenic acid derivatives of the aforementioned type which contain instead of the N—$SCFHal_2$-group the $NSCCl_3$-group are already known from the literature. In the U.S. patent specifications Nos. 2,553,770; 2,553,771; 2,553,772; 2,553,774; 2,553,775; 2,553,776 and 2,844,628 are described a large number of compounds containing the trichlormethyl-mercapto group.

In the U.S. application Ser. No. 148,845 there are already described N-thiomonofluoro-dichloro-methyl imides and a process for the production of such sulphenic acid derivatives, characterized in that compounds of the formula

in which Y and Z have the same significance as given above are reacted with dichlorofluoromethane-sulphenic acid chloride.

According to the disclosure of the aforementioned patent specification, the sulphenic acid derivatives therein described are distinguished by an outstanding fungicidal activity combined with a good plant tolerance and possess also a high initial and long-lasting activity. For this reason the products are intended to be applied as plant protection agents, mainly as fungicides.

In accordance with the present invention it has now been found that the sulphenic acid derivatives of the above mentioned general formula containing the >$NSCFHal_2$-group are fungicidally highly active products and therefore are particularly suitable as pest control agents, especially for controlling the growth of fungi. In this respect the inventive compounds are superior to those of the cited prior art containing the >$NSCCl_3$-group.

The novel inventive compounds are obtained, by reacting compounds of the general formula

with sulphenic acid halides of the formula

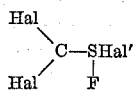

The reaction may be represented by the following scheme

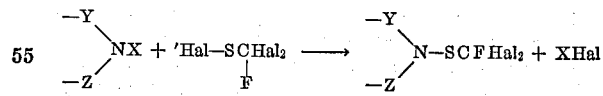

This reaction scheme is only given for the purpose of illustrating the invention and not intended to limit it in any way.

In the aforementioned formulae Y, Z and Hal have the significance as given further above; while Hal' stands for chlorine or bromine and X for hydrogen or a monovalent cation especially a metal ion.

As starting materials to be reacted according to the invention there may be mentioned for example: phthalimide, tetrahydrophthalimide, 3,6-endomethylene-Δ⁴-tetrahydrophthalimide, 3-nitrophthalimide, succinimide, 2,4-dioxothiazolidine, parabanic acid, 1,4-dioxyphthalazine, benzene sulphonic acid methylamide, 4-chlorobenzene sulphanilide, chloromethyl sulphanilide or N,N,N'-trimethylsulphamide.

The halogenated fluoromethane sulphenic acid halides of the formula, as given above further required as starting materials for the process according to the invention such as e.g. bromochlorofluoro- and dibromofluoro-methane sulphenic acid bromide, can be produced partly in analogous manner to that described in the German patent specification 1,058,502 from dichlorofluoromethane sulphenic acid chloride or -bromide by reaction with aqueous hydrobromic acid; to some extent the compounds are already known in the literature.

Thus for example, difluorochloromethane sulphenic acid chloride is obtained according to N. N. Jarovenkovin Z. Obsc, Chim., vol. 29, page 2163 (1959), while trifluoromethane sulphenic acid chloride has been described by C. V. Tullock (J. Org. Chem., vol. 25, page 2016 (1960)).

Especially fungicidally active compounds of the present invention may thus be represented by the following formula $$R-A-N-SCFHal_2$$
$$\quad\quad\quad\;\;|$$
$$\quad\quad\quad\;\;R'$$

in which R and R' stand for any organic residues, possibly linked to A via a heteroatom a.e. nitrogen, oxygen or sulphur too and A is a $SO_2$- or $CO$- group while Hal means chlorine, bromine and/or fluorine, whereby at least one Hal should be bromine or fluorine. Other inventive compounds which are distinguished by an excellent fungicidal action are illustrated by the following formula $$R\overset{A}{\underset{A}{\diagup\!\!\!\diagdown}}NSCFHal_2$$

wherein R represents one or more organic radicals and A and Hal have the same significance as given above.

The organic residue R may be any aliphatic, cycloaliphatic, aromatic, araliphatic or heterocyclic radical which may be attached furthermore to the said group also by heteroatoms such as nitrogen, oxygen or sulphur.

The reaction to prepare the inventive compounds is performed at room temperature or at slightly elevated temperature either in an aqueous medium or in an inert organic solvent such as benzene, chlorobenzene, carbon tetrachloride dioxan and the like. In the case if the free imides are used i.e. if X in the above general formula is hydrogen, the reaction is expediently carried out in the presence of acid-binding agents such as alkali hydroxides, -alcoholates, -carbonates or tertiary amines.

As already mentioned above the inventive compounds are valuable pesticides and possess especially outstanding fungicidal properties. Therefore they are to find application as plant protection and particularly as fungus combatting agents.

The main advantage of the sulphenic acid derivatives according to the invention in comparison to the aforementioned trichloro-methyl compounds of the prior art is the better plant tolerance of the latter, particularly in respect of phytotoxicity without any decrease of the fungicidal properties. Moreover the new inventive compounds show a longer lasting action as well as a better stability than these of the cited prior art.

From the following experiment there is to be seen the high initial activity of the inventive compounds. The test is a green-house experiment and has been carried out with tomato plants (Bonny Best). Aqueous emulsions of the compounds shown in the table below have been prepared by admixing the active ingredient with the same amount of dimethyl formamide and a commercial non-ionic emulsifier (NP10). Plants sprayed with these solutions are inoculated after 24 hours with Zoosporangia of *Phytophthora infestans*, and placed in humidity chambers at a temperature of 20° C. and a relative humidity of 100%. They are kept there for 5 days. After that the infestation has been checked and is shown in the table below in comparison to an untreated control test, infestation of which is set as 100.

TABLE 1

| Compound | Degree of infestation by *Phytophthora infestans* (in percent) at a concentration of active ingredient (aqueous emulsion) of— | |
|---|---|---|
| | 0.025% | 0.0062% |
| 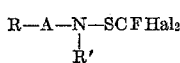 NSCFBrCl (phthalimide) | 0 | 11 |
| NSCFBrCl (hexahydrophthalimide) | 4 | 62 |
| $(H_3C)_2-N-SO_2-N-SCFBrCl$ (N-phenyl) | 0 | 1 |
| Control (untreated) | 100 | |

TABLE 2

| Compound | Degree of infestation by *Phytophthora infestans* (in percent) at a concentration of active ingredient (aqueous emulsion) of—0.1 |
|---|---|
| 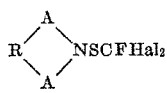 $N-SCFBr_2$ (phthalimide) | 0 |
| $N-SCFBr_2$ (hexahydrophthalimide) | 2 |
| $(H_3C)_2-N-SO_2NSCFBr_2$, $C_6H_5$ | 1 |
| Control (untreated) | 100 |

TABLE 3

| Compound | Degree of infestation by *Phytophthora infestans* (in percent) at a concentration of active ingredient (aqueous emulsion) of—0.025 |
|---|---|
| $N-S-CF_2-Cl$ (phthalimide) | 30 |
| $N-S-CF_2Cl$ (hexahydrophthalimide) | 35 |
| $(CH_3)_2N-SO_2-N-S-CF_2Cl$ (N-phenyl) | 19 |
| Control (untreated) | 100 |

The following examples illustrate the invention as claimed.

EXAMPLE 1

A slurry of 12 g. of potassium phthalimide in 100 ml. of dioxan is treated dropwise with 12 g. of bromochlorofluoromethane sulphenic acid bromide (B.P.: 47° C./11 mm. Hg). The temperature of the mixture rises to about 40° C. The latter is then stirred for some time and the reaction product precipitated by adding water. After recrystallizing the products from dry-cleaning benzene, 9 g. of N-(bromochlorofluoromethylthio)-phthalimide of M.P. 160–162° C. are obtained. In an analogous manner the following products can be produced:

| Constitution | Physical Properties |
|---|---|
| 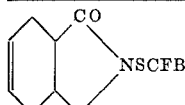 | M.P.: 112–118° C. |
| (H$_3$C)$_2$NSO$_2$—N—SCFBrCl<br>  $\quad\quad\quad\quad\quad$ C$_6$H$_5$ | M.P.: 105–108° C. |
| 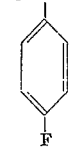 | |
| 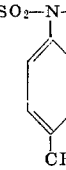 | |
| 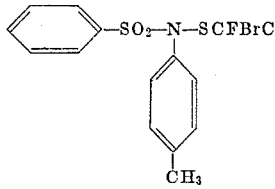 | |
| 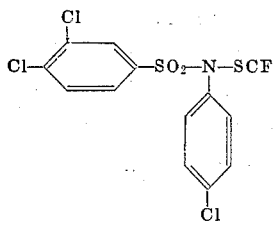 | |
|  | |
| 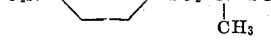 | |
| 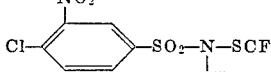 | |

EXAMPLE 2

9 g. of potassium phthalimide are reacted in the same way as described in Example 1 in 100 ml. of dioxan with 15 g. dibromofluoromethane sulphenic acid bromide (B.P.: 56 to 66° C./12 mm. Hg). After addition of water to the reaction mixture 10 g. N-(dibromofluoromethylthio)-phthalimide of M.P. 166° C. are obtained.

Under analogous reaction conditions the following compounds are obtained:

| Constitution | Physical Properties |
|---|---|
| 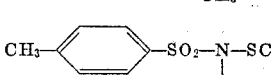 | Oil. |
| (H$_3$C)$_2$NSO$_2$—N—SCFBr$_2$<br>$\quad\quad\quad\quad\quad$C$_6$H$_5$ | M.P.: 95–97° C. |
| 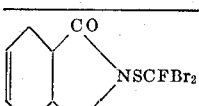 | |
| 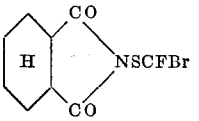 | |
| 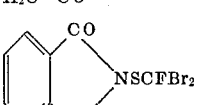 | |
| 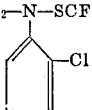 | |
| 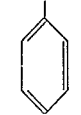 | |
| 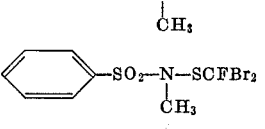 | |
| 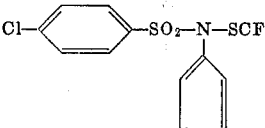 | |
|  | |
| 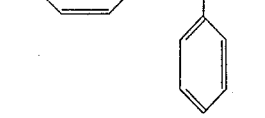 | |
| 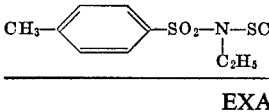 | |
| 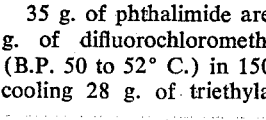 | |

EXAMPLE 3

35 g. of phthalimide are slurried in a solution of 38.5 g. of difluorochloromethane sulphenic acid chloride (B.P. 50 to 52° C.) in 150 ml. of toluene. With external cooling 28 g. of triethylamine are added dropwise to this suspension at 10 to 20° C., the mixture is stirred for some time and the undissolved portions then filtered off with suction. The filter residue yields, after washing with water, 42 g. of N-(chlorodifluoromethylthio)-phthalimide, which melts, after recrystallization from alcohol, at 153 to 155° C.

In a corresponding manner the following compounds are obtained:

| Constitution | Physical Properties |
|---|---|
| (phthalimide-NSCF₂Cl, tetrahydro) | M.P.: 69–72° C. |
| (H₃C)₂NSO₂NSCF₂Cl, C₆H₅ | M.P.: 68–70° C. |
| (hexahydrophthalimide with H, NSCF₂Cl) | |
| (saccharin-type ring NSCF₂Cl, SO₂) | |
| (H₃C)₂N—SO₂—NSCF₂Cl, C₆H₄Cl | |
| (H₅C₂)₂N—SO₂—NSCF₂Cl, C₆H₄CH₃ | |
| H₃C—SO₂—N—SCF₂Cl, C₆H₄CH₃ | |
| H₅C₂—SO₂—N—SCF₂Cl, C₆H₄Cl | |
| ClCH₂—SO₂—N—SCF₂Cl, C₆H₅ | |
| C₆H₅—SO₂—NSCF₂Cl (p-Cl) | |
| Cl—C₆H₄—SO₂—N—SCF₂Cl, CH₃ | |

EXAMPLE 4

23 g. of potassium phthalimide are slurried in 200 ml. of toluene and this suspension is treated dropwise at 0 to 10° C. with external ice cooling with 70 ml. of a toluene solution which contains 17 g. of trifluoromethane sulphenic acid chloride (B.P.: −1° C.). The reaction mixture is then stirred for 3 hours, the precipitated potassium chloride filtered off with suction and the filtrate concentrated in a vacuum. From the residue there can be isolated, after recrystallization from methanol, 18 g. of N-(trifluoromethylthio)-phthalimide of M.P.: 114–116° C.

In the same way there are obtained the following compounds (H₃C)₂NSO₂NSCF₃, C₆H₅ of M.P.: 78–80° C.

(hexahydrophthalimide-NSCF₃, H)

(tetrahydrophthalimide-NSCF₃)

(succinimide-NSCF₃: H₂C—CO, H₂C—CO)

(H₅C₂OOC)₂C—NSCF₃

H₃C—C₆H₄—SO₂—NSCF₃, H₃CCO

C₆H₅—SO₂—N—N=CH—C₆H₅, SCF₃

Cl—C₆H₄—N—N=CH—C₆H₄—Cl, SCF₃

C₆H₅—CH=C—CO, S—N—SCF₃, S=O (thiadiazoline ring)

(furyl)—CH=C—CO, S—N—SCF₃, C=O

We claim:
1. A compound of the formula

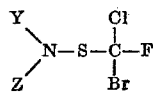

wherein:
Y is N,N-dimethylamino or N,N-diethylamino radicals, said Y radical being attached to the N-atom with a bridging —SO$_2$— group;
Z is phenyl or 4-chlorophenyl and
Y and Z are also defined in combination with the nitrogen atom as tetrahydrophthalimide.

2. A compound of the formula

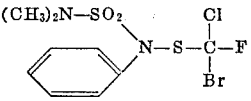

References Cited
UNITED STATES PATENTS
3,285,929  11/1966  Klauke et al. _____ 260—301

ALEX MAZEL, Primary Examiner
J. A. NARCAVAGE, Assistant Examiner

U.S. Cl. X.R.

260—240, 326, 326.5, 306.7, 309.5, 481; 424—269, 270, 274, 320